Sept. 13, 1966  A. P. MORABITO  3,272,153
DOUGH DIVIDER
Filed Dec. 20, 1963  3 Sheets-Sheet 1
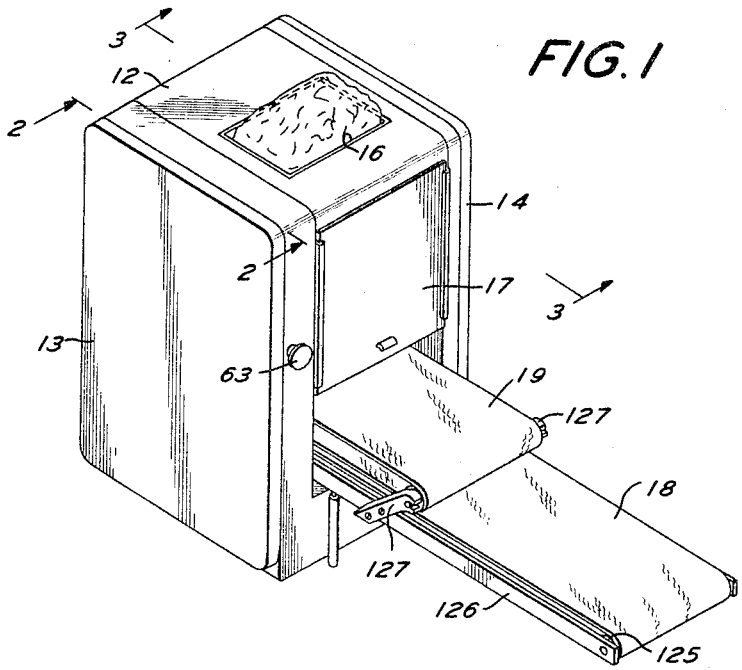
FIG. 1
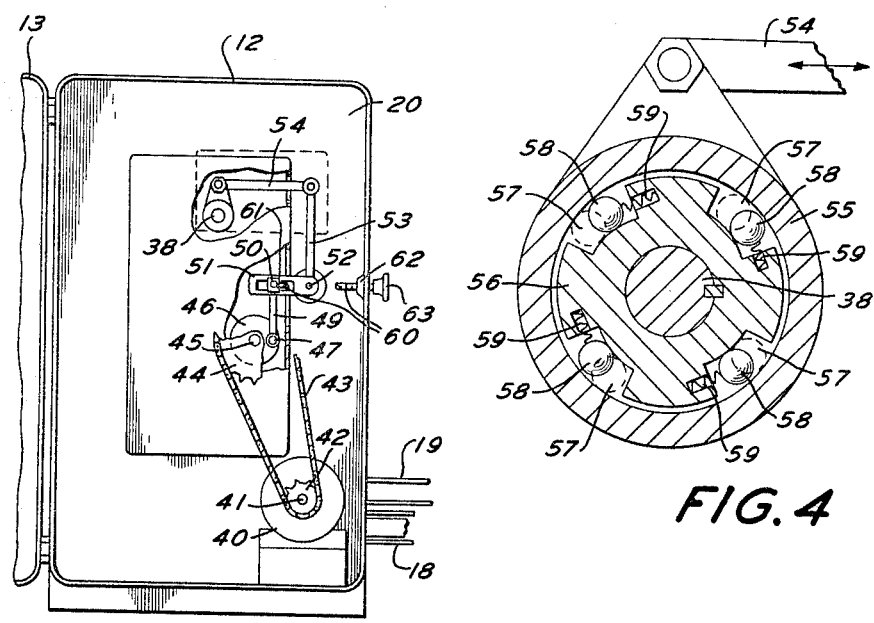
FIG. 2
FIG. 4
INVENTOR.
ANTHONY P. MORABITO
BY
ATTORNEY

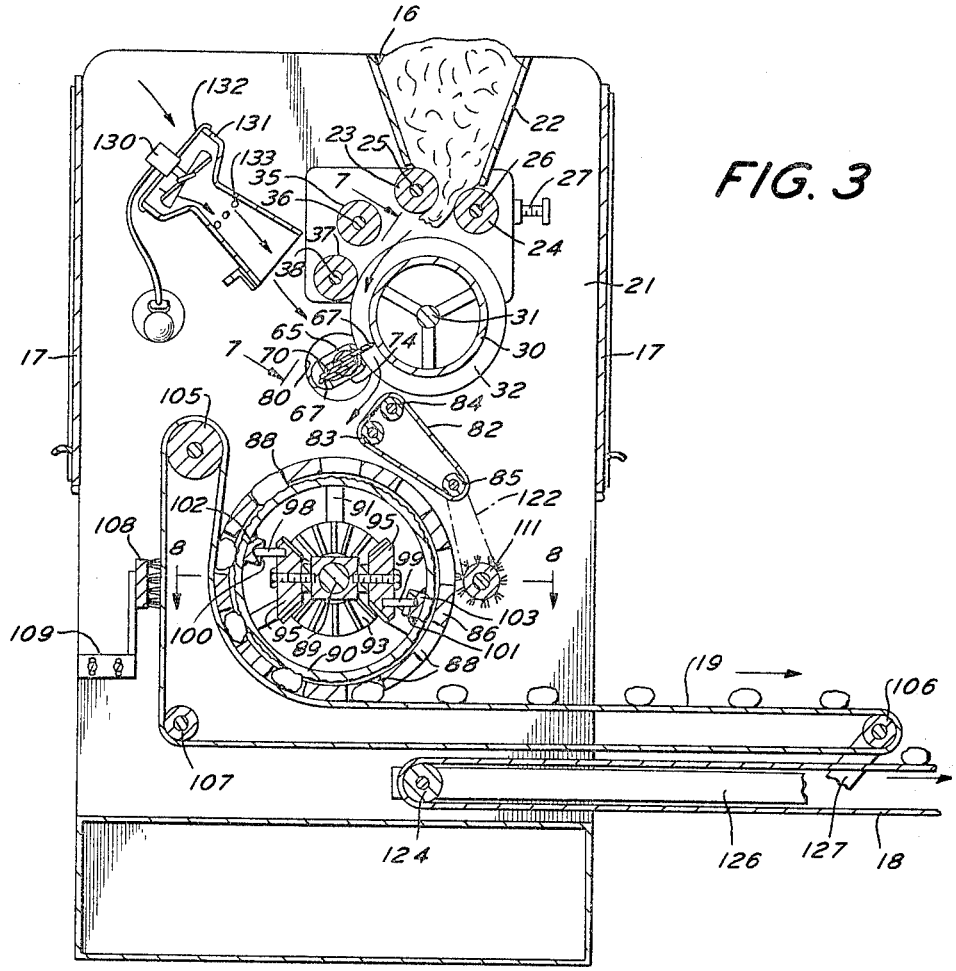

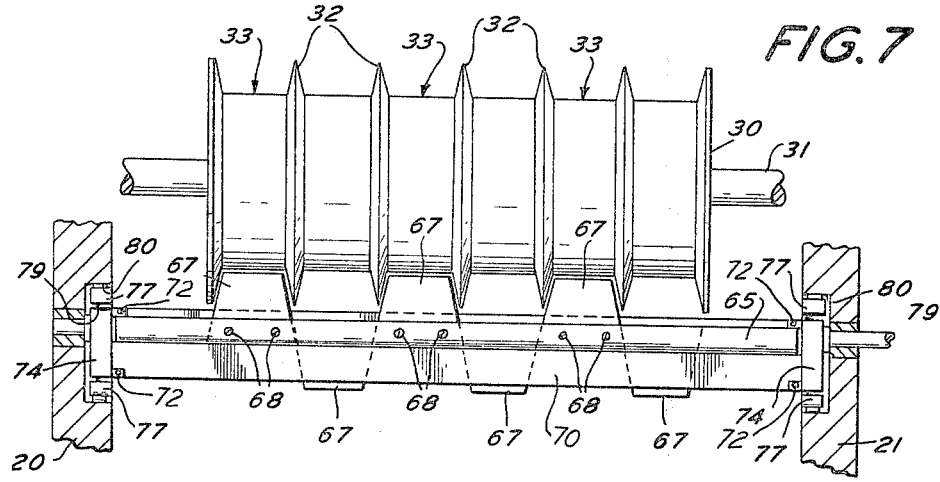
FIG. 7
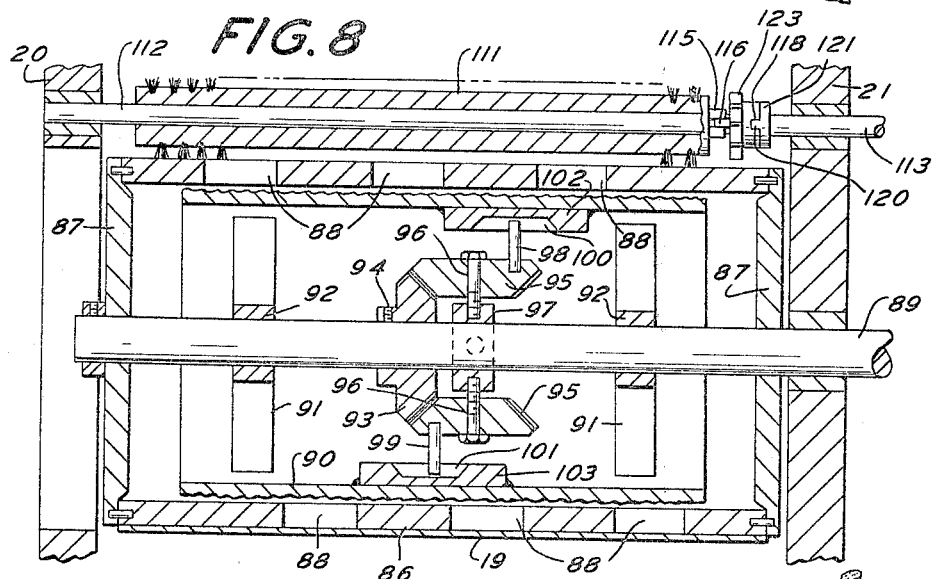
FIG. 8
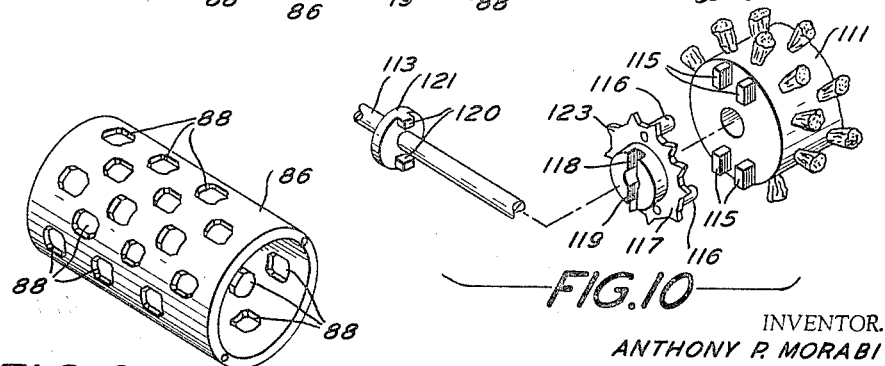
FIG. 9
FIG. 10
INVENTOR.
ANTHONY P. MORABITO
BY
ATTORNEY United States Patent Office 3,272,153
Patented Sept. 13, 1966

3,272,153
DOUGH DIVIDER
Anthony P. Morabito, % Topos Mondial Corp.,
755 Kohn St., Norristown, Pa.
Filed Dec. 20, 1963, Ser. No. 332,096
10 Claims. (Cl. 107—4)

This invention relates to dough dividers and more particularly to a dough divider for rolls and the like.

Various dough dividers have heretofore been proposed but these have had various shortcomings including slow speed, inadequate control of the size and shape of the product, troubles due to the dough not being freed from the apparatus, and others.

It is the principal object of the present invention to provide a dough divider which is particularly suited for making rolls and the like and in which uniformity of the product is atained with a high productive rate.

It is a further object of the present invention to provide a dough divider which is particularly suited for making rolls and the like in which a close control of the size and shape of the product is maintained, the divided dough is rounded after separation and delivered for proofing and the entire operation is expeditiously carried out.

It is a further object of the present invention to provide improved operation in a dough divider by the use of a controlled air stream.

It is a further object of the present invention to provide a dough divider in which the dough is advanced and separated into strips, the strips have portions of predetermined size cut therefrom, the severed dough portions are guided and directed to a drum where the separate severed dough portions are rounded, and the separated dough portions are then delivered for proofing, the entire operation being carried out continuously and within a eviroment which aids in the operation.

Other objects and advantageous features of the invention will be apparent from the description and claims.

The nature and characteristic features of the invention will be more readily understood from the following description taken in connection with the accompanying drawings forming part thereof, in which;

FIGURE 1 is a view in perspective of a dough divider in accordance with the invention as seen from the exterior thereof;

FIG. 2 is a vertical sectional view, taken approximately on the line 2—2 of FIG. 1;

FIG. 3 is a vertical sectional view, enlarged, taken approximately on the line 3—3 of FIG. 1;

FIG. 4 is an enlarged vertical sectional view showing a driving clutch for the divider blade shaft;

FIG. 5 is a fragmentary perspective view of the divider blade and its end mounting;

FIG. 6 is a transverse sectional view showing the details of construction of the divider blade;

FIG. 7 is a fragmentary view taken approximately on the line 7—7 of FIG. 3;

FIG. 8 is a horizontal sectional view taken approximately on the line 8—8 of FIG. 3;

FIG. 9 is a view in perspective of a receiving and forming cylinder removed from the machine; and FIG. 10 is an exploded fragmentary perspective view of a brush and driving connections employed with the machine of the present invention.

It should, of course, be understood that the description and drawings herein are illustrative merely, and that various modifications and changes can be made in the structure disclosed without departing from the spirit of the invention.

Like numerals refer to like parts throughout the several views.

Referring now more particularly to the drawings, an outer housing 12 is shown preferably of sheet metal or the like, and of a composition or surface finish which may be easily kept in clean condition. The housing 12, has side access doors 13 and 14, and at the top thereof an opening 16 for introduction of dough. At the front and back of the housing 12 slidable interior access doors 17 are provided, with a delivery conveyor belt 18 extending beneath a conveyor belt 19 which forms part of the machine as hereinafter explained.

Within the housing 12 spaced vertical frame plates 20 and 21 are provided held in spaced relation in any desired manner.

Extending downwardly from the opening 16 at the top of the housing 12 a dough hopper 22 is provided for the delivery of dough to the space between a pair of oppositely rotatable dough feed rollers 23 and 24 which are carried on shafts 25 and 26, respectively, supported by the frame plates 20 and 21. One of the roller shafts, such as the roller shaft 26 can be mounted in horizontally movable guides (not shown) carried by the frame plates 20 and 21 for front to rear adjustment by screws 27, to vary the thickness of the sheet of dough delivered between the rollers 23 and 24.

Beneath the feed rollers 23 and 24 a dough dividing drum 30 is provided, mounted on a shaft 31 and with a plurality of spaced flanges 32 on its periphery to provide dough channels 33 therebetween.

A dough guide roller 35, on a shaft 36 spaced from the drum 30 and its flanges is provided and a dough guide roller 37 or a shaft 38 is provided close to or engaging the flanges 32. The shafts 36 and 37 are carried in the frame plates 20 and 21.

The guide rollers 35 and 37 guide the dough from the feed rollers 23 and 24 and insure its disposition in the dough channels 33.

The shafts 25, 26, 31, 36 and 38 are simultaneously rotated by any suitable gearing (not shown) with the shafts 25, 36 and 37 moved clockwise, and the shafts 26 and 31 moved counterclockwise, as seen in FIG. 3.

Any suitable mechanism may be employed but it is preferred that the shafts 25, 26, 31, 36 and 38 be intermittently operated in timed relation and for this purpose (see FIG. 2) a motor 40 can be provided having a shaft 41 with a sprocket 42 thereon. The sprocket 42 is connected by a chain 43 to a sprocket 44 secured to a stub shaft 45 carried on the frame plate 20. The shaft 45 has a crank plate 46 thereon having a crank pin 47. A connecting arm 49 on the pin 47 is connected to a slide block 50 in a slide guide 51. The slide guide 51 is mounted on a pivot pin 52 and has a lever arm 53 connected thereto, which in turn is pivotally connected to a link 54. The link 54 is connected to a hollow cylindrical clutch sleeve 55 (see FIG. 4) within which a clutch ball retainer 56 is enclosed. The retainer 56 has a plurality of peripheral recesses 57 with balls 58 therein urged against the inner face of the sleeve 55 by springs 59.

The clutch ball retainer 56 is keyed to one of the shafts of the roller shaft group, the shaft 38 being preferred.

In order to vary the extent of rotary advancing movement of the rollers 23, 24, 35 and 36 and the drum 30, the slide guide 51 is adjustably positioned along the slide block 50 by an adjusting rod 60 connected to the slide block 50 by a universal pivotal connection 61. The rod 60 has a portion threaded in a nut 62 and has a knob 63 on the end to facilitate turning the rod 60 for purposes of adjustment.

In order to separate measured quantities of dough from the strips of dough in the dough channels 33 between the flanges 32, a shaft 65 is provided having an elongated blade slot 66. Alternately oppositely extending blades 67 are held by rivets 68 to the separated portions of the shaft 65 on opposite sides of the slot 66. The blades 67 are complemental in shape to the channels 63.

Between the blades 67 on each side a slidable stripper plate 70 is inserted. The plate 70 at its ends has openings 71 through which pins 72 extend. The pins 72 engage in lugs 73 carried by eccentric blocks 74 at each end. The blocks 74 have slots 75 engaged on flats 76 on the shaft 65 and have guide ends 77 with rollers 78 and positioning springs 79. The rollers 78 engage in eccentric openings 80 in the frame plates 20 and 21. Upon rotation of the shaft 65 the stripper plate 70 is retracted as the blades 67 advance into cutting relation to the dough in the channels 33 and upon continued movement of the blades 67 out of the channels 33 the stripper plate 70 is advanced to aid in separation of the dough from the blades 67.

The shaft 65 is preferably operated in unison with the shaft 31 and at the desired speed ratio to determine the size of dough pieces which are severed by the blades 67.

Below the drum 30 and positioned in spaced relation to the shaft 65 a guide conveyor belt 82 is provided mounted on rolls 83, 84 and 85, one of which is driven in any desired manner. The belt 82 is advanced with the blades 67 to aid in the delivery of the separated dough pieces to a rounding cell drum 86.

The drum 86 is cylindrical, is carried by end plates 87 and has a plurality of cells or dough receiving compartments 88 formed thereon and of any desired shape. Squares with bevel corners have been found suitable for the shape of the cells 88. The drum end plates 87 are carried on a shaft 89 which is driven in any desired manner and counterclockwise as seen in FIG. 3.

Within the drum 86 an agitating drum 90 is provided, preferably with a roughened surface. The drum 90 is mounted on spiders 91 which have central bearing portions 92 slidably carried on the shaft 89.

The drum 90 is preferably given an oscillatory movement lengthwise with respect to the drum 86 and also for oscillatory movement in rotation. For this purpose the shaft 89 has a bevel gear 93 secured thereto by a set screw 94. Bevel gears 95 mounted on stub shafts 96 carried on a collar 97 on the shaft 89 have crank pins 98 and 99 engaged in slots 100 and 101, in driving blocks 102 and 103 welded to the interior of the drum 90.

The belt 19 is carried on a support roller 105 at a level above that of the top of the drum 86, extends downwardly and around a portion of the periphery of drum 86 and then horizontally to and around a support roll 106, then horizontally around a roll 107, then upwardly to and around the roller 105.

In order to retain the belt 19 in clean condition and free from adherent material a horizontal brush 108 can be provided carried by a bracket 109.

The exterior of the drum 86 can also be kept in clean condition and free from adherent material by a rotary cylindrical brush 111 mounted on a shaft 112. The shaft 112 is journaled in the frame plate 20 and is detachably coupled to a driving shaft 113 in the frame plate 21. The coupling as shown comprises spaced lugs 115 on the end of the brush cylinder 111 with drive pins 116 engageable therebetween. The drive pins 116 are carried on a sprocket 117 having an end socket 118 thereon with a diametrical groove 119 for engagement by extensions 120 on a collar 121 which is carried on the shaft 113.

The sprocket 117 can be connected by a chain 122 to a sprocket 123 carried on the roller 85.

The belt 18, is preferably carried on rollers 124 and 125 mounted on a frame 126 with supporting brackets 127 extending upwardly therefrom to support the roller 106 and the belt 19 carried thereby.

Between the frame walls 20 and 21, an electric motor driven fan 130 is provided within a shroud 131 to direct air entering at an inlet 132 toward the drum 30 and the location at which the blades 67 perform their dough severing operation to dry the exterior of the dough to a limited extent. This has been found to facilitate the handling and reduce the tendency to adhere to the drum 30 and the flanges 32, as well as the blades 67.

An electric resistance heating element 133 may be provided for raising the temperature of the air to a very limited extent, if desired.

With dough in the hopper 22 tending to slump down by its weight the rotation of the feed rolls 23 and 24 causes a flat sheet of dough to be delivered onto the drum 30 where it is divided into strips by the flanges 32. The dough strips are guided by the guide roller 35 and the guide roller 37.

As the strips of dough are advanced by rotation of the drum 30 the separated blades 67 engage with the dough strips in alternate channels 33 and separate portions of the dough strips, measured as to length. As the shaft 65 rotates the alternate and diametrically oppositely extending blades 67 advance, engage the strips which alternate with those from which dough portions have been cut immediately preceding and separate additional dough portions. With the blades 67 as shown three dough portions are severed at each half rotation. The stripper plate 70 with gravity insure the separation of the dough portions from the blades 67.

The dough portions as they are separated are guided by the belt 82 and fall into the cells 88 therebelow.

Rotation of the drum 86 with the composite motion of the drum 90 and with the separated dough portions held within the cells by the belt 19 effects a rounding of the dough portions during their retention so that rounded and almost spherical dough portions are delivered horizontally by the belt 19 for discharge onto the belt 18 for proofing or the like.

As the dough is advanced by the dividing drum 30 air directed onto the strips has a slight drying action which avoids adherence of the dough, further facilitating the delivery for severing by the blades 67. The temperature of the air can be elevated if desired by employing the heating element 133.

The drum 86 and belt 19 have adherent material removed by the brush 111 and the brush 108 during their movement.

I claim:
1. A dough divider comprising a housing, a dough hopper in said housing, a rotatably mounted dough feed drum having a plurality of circumferential flanges for separating dough from said hopper into a plurality of strips, a rotatable cutter member having a plurality of spaced blades thereon movable toward said drum into cutting engagement with the dough in said strips, a horizontally disposed rotatably mounted dough receiving drum having a plurality of dough receiving cells in the periphery thereof, an agitating drum in said dough receiving drum and movable with respect thereto for moving the dough in said cells, members for guiding the dough into said cells, and a belt having a portion in peripheral engagement with a portion of said dough receiving drum for closing said cells during a portion of their travel and for discharge of dough pieces from said cells.

2. A dough divider as defined in claim 1 in which an air delivery member is provided for delivering air onto said dough feed drum and said blades.

3. A dough divider as defined in claim 2 in which a heater is provided for heating the air for said air delivery member.

4. A dough divider as defined in claim 2 in which said members for guiding said dough into said cells comprises an endless belt between said feed drum and said dough receiving drum.

5. A dough divider as defined in claim 1 in which said blades are alternately oppositely disposed and a stripper plate is provided movable along said blades in the planes thereof for stripping dough therefrom.

6. A dough divider as defined in claim 1 in which intermittent operating means is provided for said cutter member.

7. A dough divider as defined in claim 1 in which a plurality of dough guide rollers are interposed between said dough hopper and said cutter member.

8. A dough divider as defined in claim 1 in which a brush member is provided engaging said belt for removing adherent material from said belt.

9. A dough divider as defined in claim 1 in which a brush member is provided engaging the periphery of said dough receiving drum for removing adherent material from said drum.

10. A dough divider comprising a housing, a dough hopper in said housing, a rotatably mounted horizontally disposed dough feed drum having a plurality of circumferential flanges for separating dough from said hopper into a plurality of strips, a rotatable cutter member having a plurality of spaced alternately oppositely extending blades thereon, said blades being rotatable toward said dough feed drum for severing pieces of dough from said strips, a horizontally disposed rotatably mounted dough receiving drum having a plurality of peripheral dough receiving cells, an agitating drum within said dough receiving drum and having surface portions movable with respect to the interiors of said cells for moving dough pieces in said cells, a continuously movable endless guide member for guiding dough pieces into said cells, an endless retaining and delivery belt having a portion extending down along and beneath said dough receiving drum in engagement therewith and therefrom for delivery of dough pieces from said cells, and means for supplying a continuous current of air toward said dough feed drum and the location of engagement of said blades with said dough strips.

References Cited by the Examiner
UNITED STATES PATENTS

| | | | |
|---|---|---|---|
| 1,126,606 | 1/1915 | Wolf | 107—4.3 |
| 1,678,747 | 7/1928 | Scholz | 107—9.7 |
| 3,125,039 | 3/1964 | Haug et al. | 107—9.7 |

FOREIGN PATENTS

| | | |
|---|---|---|
| 947,049 | 1/1964 | Great Britain. |

LOUIS O. MAASSEL, *Primary Examiner.*